Jan. 13, 1970   T. M. DAUPHINEE   3,489,982
PLANETARY ELECTRICAL CONTACT
Filed April 19, 1968
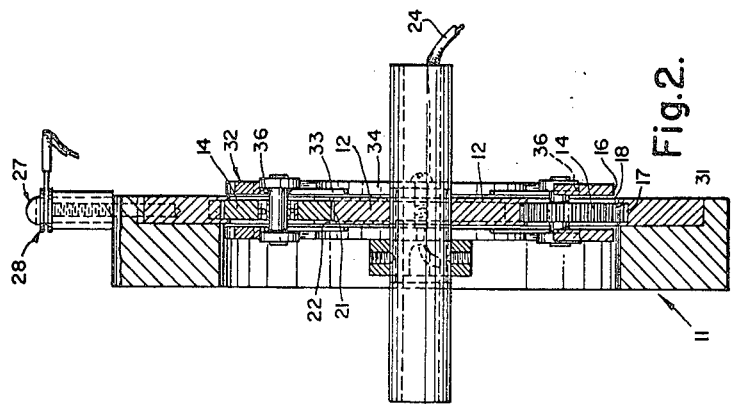
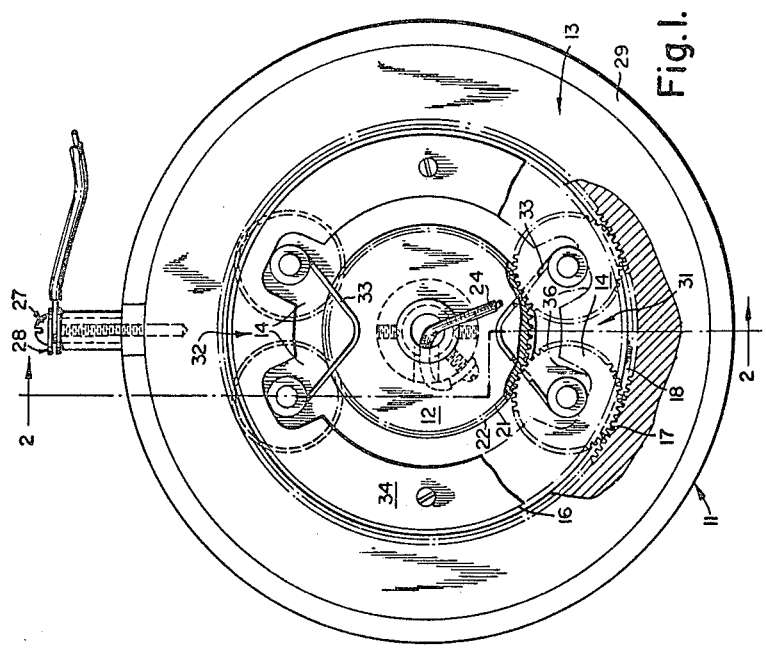
INVENTOR
THOMAS M. DAUPHINEE
By
AGENT United States Patent Office 3,489,982
Patented Jan. 13, 1970

3,489,982
PLANETARY ELECTRICAL CONTACT
Thomas M. Dauphinee, 36 Avenue Road,
Ottawa, Ontario, Canada
Filed Apr. 19, 1968, Ser. No. 722,729
Int. Cl. H01r 39/00
U.S. Cl. 339—5                                    1 Claim

ABSTRACT OF THE DISCLOSURE

A planetary electrical contact includes a modified elliptical gear train with rotatable hub and circumscribing annular housing with tandem planetary gear members biasingly disposed therebetween. The gear members are adapted to rotate as the hub rotates relative to the housing, and to provide constant electrical connection between the hub and housing. Preferably, the hub and housing have raceways cut into their surface profiles with teeth elements disposed in the raceways, such that the planetary gears are adapted to travel through the teethed raceways.

---

This invention relates to a planetary electrical contact.

Planetary electrical contacts are common. Some include conductive flexible band or gear members mounted between a conductive inner rotating hub and a conductive outer stationary housing. Others include conductive roller members mounted for rotation on the inner rotating hub adapted to roll at intimate contact against the outer stationary housing. These and other planetary electrical contacts suffer from one of several disadvantages in that either excessive wear results between the housing and the hub due to excessive slip of the band, gear, or roller members; or, the electrical contact between the hub and housing becomes corroded because the band, gear or roller members do not provide sufficient slip to keep the surfaces clean.

The invention contemplates a planetary electrical contact of substantially rigid conductive components which are urged in comparatively flat intimate pressure contact with each other for good effective contact area, but due to the profile of the conductive components, permit slight slip which tends to keep the surfaces clean when used in low level operation.

The invention thus contemplates a planetary electrical contact comprising:

(a) Rotatable hub member having conductive teeth elements disposed about its circumference.

(b) A circumscribing annular housing having conductive teeth elements on its inner periphery.

(c) Conductive gear members disposed between the hub and housing adapted to mesh with the teeth elements of the housing and of the hub member such that constant electrical contact is made through the housing, gear members and hub irrespective of the angular displacement of said hub member with said housing.

The invention also contemplates two pairs of conductive gear members diametrically disposed across said hub member and means biasing said gear members in intimate mesh with the teeth elements of the housing of the hub member.

The embodiments of the invention will now be described by way of example, with reference to the accompanying drawings in which:

FIGURE 1 is a plan view of the preferred embodiment.

FIGURE 2 is an elevation, in cross-section along lines II—note II of the embodiment of FIGURE 1.

A planetary electrical contact 11, being a modified epicyclic gear train includes a hub member 12, a circumscribing annular housing 13 and planetary gear members, preferably conductive spur gears 14, which are disposed between the hub member 12 and the housing 13.

As the hub member 12 is rotated relative to said housing 13, the planetary gear members 14 migrate about the hub member 12 to provide constant electrical contact therewith.

The housing 13, has disposed about its inner periphery 16, conductive teeth elements 17. Preferably, the conductive teeth elements 17 are disposed along the inside of a raceway 18, which is cut circumferentially about the inner periphery 16.

The hub member 12 also has disposed about its circumference conductive teeth elements 21. Preferably, the teeth elements 21 are also disposed along the inside of a raceway 22, which is cut circumferentially about the circumference. The conductive spur gears 14, have substantially squared tooth profile, and are adapted to migrate in the raceways 18 and 22 such that the teeth of the spur gears 14 mesh with the teeth elements 17 and 21. The raceway 17 and 22 "hold" the spur gears in appropriate axial position and prevent them from being removed, as by vibration, from their respective positions and ensures a good physical contact and electrical connection between the hub member 12 and the housing 13 through the conductive spur gears 14.

Appropriate means, for example, a conductor 24, makes electrical contact with the hub member 12 and a terminal 26, while a second conductor, conductive bolt 27 makes electrical connection between the conductive teeth elements 21 and the housing terminal 28 through an insolating annulus 29, part of the housing 13. Electrical current can readily pass between the terminals 26 and 28 irrespective of the angular relationship between the hub means 12 and the housing 13.

In order to ensure that the planetary electrical contact 11 makes good electrical contact between the terminals 26 and 28, the gear members 14 are tandemly paired and constrained in intimate mesh, with the teeth elements 17 and 22; that is, two pair of gear members, conductive spur gears 14 are provided, each pair in tandem relation, one pair 31 in tandem relation diametrically disposed to another pair 32 also in tandem relation. Preferably, the spur gears 14, in each tandem pair are biasingly urged in close relationship by appropriate means (biasing means) for example, a spring element 33, which may be composed of conductive material.

To ensure that the tandem pairs of gears 31 and 33 remain in diametrically disposed tandem relationship, the spacing annuli 34 and 35 are provided having appropriate disposed notches or seats 36 therein against which the axis of the spur gears 14 bear. One spacing annulus 34 abuts one surface of the spur gears 14 while the other spacing annulus, which is axially disposed from the first spacing annulus 34, abuts the obverse side of the spur gears 14 such that the gears 14 are disposed between the annuli 35 and 34. The annuli 35 and 34 migrate about the hub means 12 when the hub means 12 is rotated relative to the housing 13. An ancillary feature of the annuli 34 and 35 is to prevent the gears 14 from being pushed outward against the teeth elements 17 by the biasing means, spring element 33, and thereby meshing too deeply with the teeth elements 17, which would otherwise result in excessive wear. The breadth of the seats 36 ensures freedom of the spring element 33 to push the spur gears 14 together ensuring proper contact pressure between the elements 17 and 21 and that of the spur gears 14. The breadth of the seats 36 also ensures that the annuli 34 and 35 freely rotate about the hub member 17 as it is rotated relative to the housing 13, with minimum wearing of the teeth elements 17 and 21.

In operation, slight slip of the gears 14 relative to the teeth elements 17 and 21 produce a wiping of the contact areas of the teeth to ensure good electrical contact.

What is claimed is:
1. A planetary electrical contact comprising:
(a) a rotatable hub member having conductive teeth elements disposed about its circumference,
(b) a circumscribing annular housing having conductive teeth elements on its inner periphery, and
(c) two pairs of conductive spur gear members with substantially square tooth profiles and of size and shape to be accommodated in and mesh with the conductive teeth on said hub and in said housing, said two pairs of gear members being diametrically disposed in tandem relationship across said hub member and including a spring element adapted to hold a pair of conductive gear members which are in tandem relationship, in relatively close proximity and in intimate contacting intermesh with the teeth elements of said hub and housing.

References Cited

UNITED STATES PATENTS

| | | | |
|---|---|---|---|
| 2,409,600 | 10/1946 | Trautschold | 310—219 |
| 3,047,827 | 7/1962 | Stoddard | 339—5 |
| 3,341,726 | 9/1967 | Brinster et al. | 339—5 X |

RICHARD E. MOORE, Primary Examiner

UNITED STATES PATENT OFFICE
CERTIFICATE OF CORRECTION

Patent No. 3,489,982 January 13, 1970

Thomas M. Dauphinee

It is certified that error appears in the above identified patent and that said Letters Patent are hereby corrected as shown below:

In the heading to the printed specification, lines 3 and 4, "Thomas M. Dauphinee, 36 Avenue Road, Ottawa, Ontario, Canada" should read -- Thomas M. Dauphinee, Ottawa, Ontario, Canada, assignor to Canadian Patents and Development Limited, Ottawa, Ontario, Canada, a corporation of Canada --.

Signed and sealed this 1st day of December 1970.

(SEAL)
Attest:

Edward M. Fletcher, Jr.
Attesting Officer

WILLIAM E. SCHUYLER, JR
Commissioner of Patents